(12) United States Patent
Wang et al.

(10) Patent No.: US 10,776,932 B2
(45) Date of Patent: Sep. 15, 2020

(54) DETERMINING WHETHER GROUND IS TO BE RE-DETECTED

(71) Applicant: BeiJing Hjimi Technology Co., Ltd, Beijing (CN)

(72) Inventors: Hang Wang, Beijing (CN); Li Li, Beijing (CN); Zan Sheng, Beijing (CN); Shuo Li, Beijing (CN); Xiaojun Zhou, Beijing (CN)

(73) Assignee: BeiJing Hjimi Technology Co., Ltd, Beijing (CN)

( * ) Notice: Subject to any disclaimer, the term of this patent is extended or adjusted under 35 U.S.C. 154(b) by 63 days.

(21) Appl. No.: 16/299,147

(22) Filed: Mar. 12, 2019

(65) Prior Publication Data

US 2019/0279372 A1    Sep. 12, 2019

(30) Foreign Application Priority Data

Mar. 12, 2018    (CN) .......................... 2018 1 0199136

(51) Int. Cl.
*G06T 7/246*    (2017.01)
*G06T 7/579*    (2017.01)
(Continued)

(52) U.S. Cl.
CPC .............. *G06T 7/246* (2017.01); *G06T 7/579* (2017.01); *G06T 7/593* (2017.01); *G06T 7/73* (2017.01)

(58) Field of Classification Search
CPC ... G11B 27/031; G06K 9/00758; H04N 5/144
See application file for complete search history.

(56) References Cited

U.S. PATENT DOCUMENTS 8,923,558 B2 * 12/2014 Richards ................. G06T 7/285
382/103
2017/0059324 A1    3/2017 Kim et al.
(Continued)

FOREIGN PATENT DOCUMENTS

CN    102538781 A    7/2012
CN    103389042 A    11/2013
(Continued)

OTHER PUBLICATIONS

State Intellectual Property Office of the People's Republic of China, Office Action and Search Report Issued in Application No. 201810199136.8, dated May 16, 2019, 9 pages, (Submitted with Machine Translation).

*Primary Examiner* — Joshua L Schwartz
(74) *Attorney, Agent, or Firm* — JCIPRNET (57) ABSTRACT

A method of determining whether a ground is to be re-detected is provided. In an example, the method includes: an i-th gravitational acceleration vector corresponding to an i-th image frame is acquired from a collecting device; when the i-th gravitational acceleration vector changes relative to an (i−1)-th gravitational acceleration vector corresponding to an (i−1)-th image frame, a value is set to a flag bit of the i-th image frame; it is determined whether the collecting device tends to be stable after a motion according to a number of set flag bits in consecutive image frames; when the collecting device tends to be stable after the motion, a similarity between the i-th gravitational acceleration vector and a ground normal vector corresponding to a current ground equation is determined; and when the similarity is less than a similarity threshold, it is determined that the ground is to be re-detected.

17 Claims, 5 Drawing Sheets

(51) Int. Cl.
 *G06T 7/73* (2017.01)
 *G06T 7/593* (2017.01)

(56) References Cited

U.S. PATENT DOCUMENTS

| | | | |
|---|---|---|---|
| 2018/0108143 A1* | 4/2018 | Zhao | G01B 11/0608 |
| 2019/0061924 A1* | 2/2019 | Kita | B64D 27/24 |
| 2019/0128677 A1* | 5/2019 | Naman | G01C 21/30 |
| 2019/0293450 A1* | 9/2019 | Hino | G05D 1/0808 |

FOREIGN PATENT DOCUMENTS

| | | |
|---|---|---|
| CN | 103745485 A | 4/2014 |
| CN | 103900473 A | 7/2014 |

\* cited by examiner

DETERMINING WHETHER GROUND IS TO BE RE-DETECTED

CROSS REFERENCE TO RELATED APPLICATIONS

This application claims priority benefit of Chinese Patent Application No. 201810199136.8, filed on Mar. 12, 2018. The entirety of the above-mentioned patent application is hereby incorporated by reference herein and made a part of this specification.

TECHNICAL FIELD

The present disclosure relates to how to determining whether a ground is to be re-detected in the technical field of image processing.

BACKGROUND

Ground detection technology can be applied to the fields of robot navigation, automatic driving, somatosensory interaction, security monitoring, and the like.

SUMMARY

Based on this, the present disclosure provides a method of determining whether a ground is to be re-detected, a monitoring system and a non-transitory machine readable storage medium.

According to a first aspect, a method of determining whether a ground is to be re-detected is provided. The method includes: acquiring an i-th gravitational acceleration vector corresponding to an i-th image frame from a collecting device, wherein i is an integer greater than 1, and the collecting device comprises a gravitational accelerometer and a depth camera; in response to determining that the i-th gravitational acceleration vector changes relative to an (i−1)-th gravitational acceleration vector corresponding to an (i−1)-th image frame, setting a value to a flag bit of the i-th image frame; determining whether the collecting device tends to be stable after a motion according to a number of set flag bits in consecutive image frames; in response to determining that the collecting device tends to be stable after the motion, determining a similarity between the i-th gravitational acceleration vector and a ground normal vector corresponding to a current ground equation; and in response to determining that the similarity is less than a similarity threshold, determining that the ground in the i-th image frame is to be re-detected.

According to a second aspect, a monitoring system is provided. The monitoring system includes a collecting device including a gravitational accelerometer and a depth camera, a processor and a machine readable storage medium storing machine executable instructions. The collecting device is configured to collect an i-th gravitational acceleration vector corresponding to an i-th image frame. When invoking the machine executable instructions, the processor is caused to perform operations includes: acquiring the i-th gravitational acceleration vector from the collecting device, wherein i is an integer greater than 1; in response to determining that the i-th gravitational acceleration vector changes relative to an (i−1)-th gravitational acceleration vector corresponding to an (i−1)-th image frame, setting a value to a flag bit of the i-th image frame; determining whether the collecting device tends to be stable after a motion according to a number of set flag bits in consecutive image frames; in response to determining that the collecting device tends to be stable after the motion, determining a similarity between the i-th gravitational acceleration vector and a ground normal vector corresponding to a current ground equation; and in response to determining that the similarity is less than a similarity threshold, determining that the ground in the i-th image frame is to be re-detected.

According to a third aspect, a non-transitory machine readable storage medium storing machine executable instructions is provided. When invoking the machine executable instructions, the processor is caused to perform operations of the first aspect.

DETAILED DESCRIPTION

Illustrative examples will be described in detail here with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present.

The terms used in the present disclosure is for the purpose of describing a particular example only, and is not intended to limit the present disclosure. The singular forms such as "a", 'said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, and the like in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information.

Depending on the context, the word "if" as used herein may be interpreted as "when" or "as" or "in response to determining".

Ground detection technology is a key technology in the fields of robot navigation, automatic driving, somatosensory interaction, security monitoring, and the like. When a camera is subjected to viewing angle change, pose adjustment and/or vibration interference, the camera may output inaccurate ground information. To ensure the ground information is stably output, that is, the output ground information is accurate, it is desired to accurately determine when to re-detect ground information.

Figure 1A:
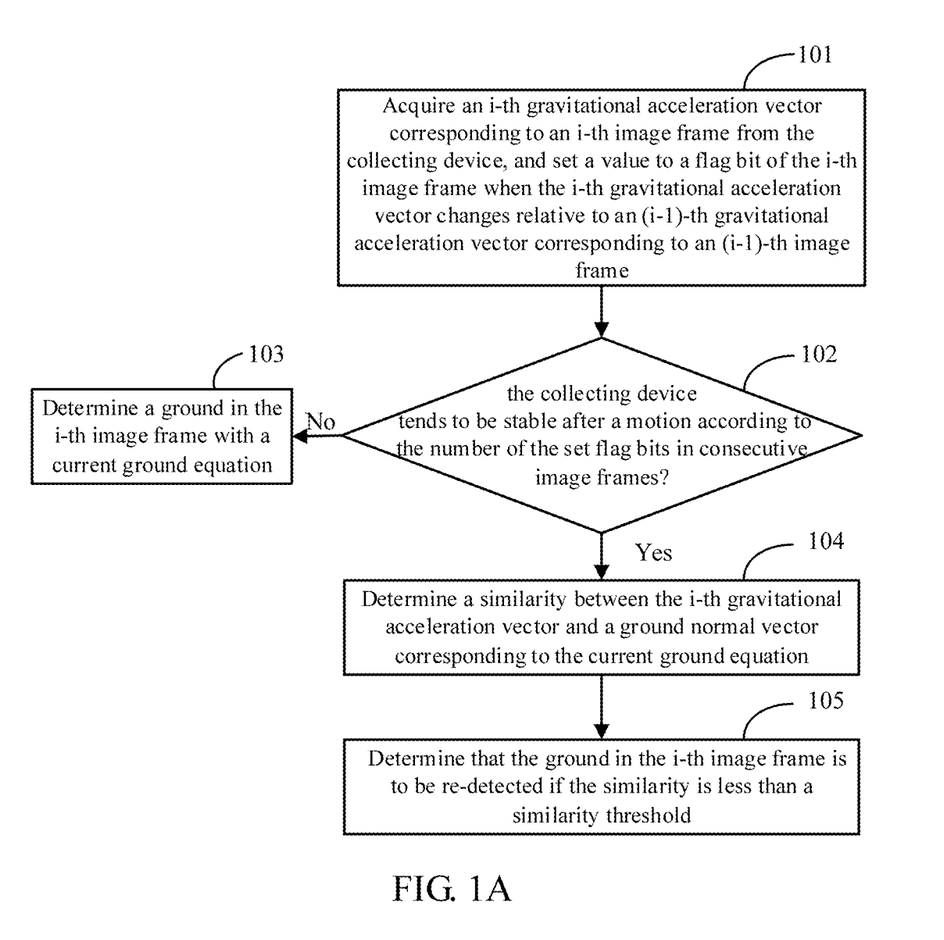
FIG. 1A is a flowchart illustrating a method of determining whether a ground is to be re-detected according to an example of the present disclosure.

FIG. 1A is a flowchart illustrating a method of determining whether a ground is to be re-detected according to an example of the present disclosure. The method may be applied to a network device (such as, a personal computer (PC)) of a monitoring system, where the monitoring system also includes a collecting device. The network device communicates with the collecting device through a network. The collecting device includes a depth camera and a gravitational accelerometer. The depth camera and the gravitational accelerometer may be integrated into the collecting device. The depth camera is configured to collect depth images, such as different image frames. The gravitational accelerometer is configured to acquire a gravitational acceleration vector of the depth camera. The network device may acquire each image frame and a gravitational acceleration vector corresponding to each image frame from the collecting device. The gravitational acceleration vector corresponding to one image frame refers to a gravitational acceleration vector of the collecting device when the depth camera collects the image frame. Since the depth camera and the gravitational accelerometer are integrated into the collecting device, the gravitational acceleration vector of the collecting device is also the gravitational acceleration vector of the depth camera. As shown in FIG. 1A, the method of determining whether a ground is to be re-detected includes the following steps.

At step 101, an i-th gravitational acceleration vector corresponding to an i-th image frame is acquired from the collecting device, and a value is set to a flag bit of the i-th image frame when the i-th gravitational acceleration vector changes relative to an (i−1)-th gravitational acceleration vector corresponding to an (i−1)-th image frame.

Figure 1B:
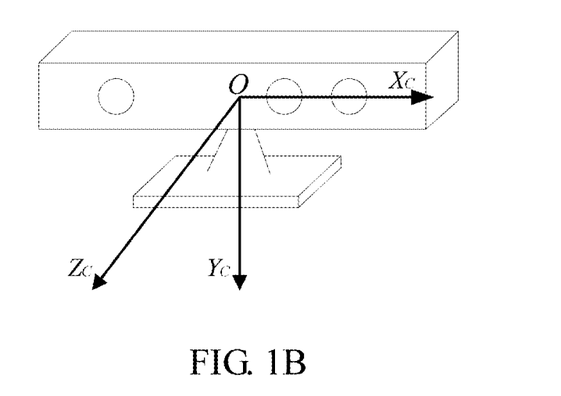
FIG. 1B illustrates a camera coordinate system according to the example shown in FIG. 1A of the present disclosure.

In an example, the gravitational acceleration vector is referenced to a camera coordinate system. In the camera coordinate system as shown in FIG. 1B, an optical center O of the depth camera is taken as a coordinate origin, an optical axis of the depth camera is taken as $Z_C$-axis, a plane formed by an $X_C$-axis and a $Y_C$-axis is taken as a plane of the depth camera, and the $X_C$-axis and the $Y_C$-axis are perpendicular to each other. Based on this, a similarity between the i-th gravitational acceleration vector and an (i−1)-th gravitational acceleration vector may be firstly calculated. If the similarity is greater than a particular similarity threshold (such as, 0.996), it is determined that the i-th gravitational acceleration vector changes relative to the (i−1)-th gravitational acceleration vector.

A cosine similarity may be taken as the similarity between the i-th gravitational acceleration vector and the (i−1)-th gravitational acceleration vector. The cosine similarity may be calculated based on the following formula (1):

$$\text{Cosine Similarity1} = \left|\frac{\vec{g1} \cdot \vec{g2}}{|\vec{g1}||\vec{g2}|}\right| = |\vec{g1} \cdot \vec{g2}|. \quad (1)$$

In the above formula (1), the i-th gravitational acceleration vector $\vec{g1}$ and the (i−1)-th gravitational acceleration vector $\vec{g2}$ are both unit vectors.

In an example, an M-bit binary variable may be preset, each binary bit corresponds to a flag bit of one image frame, and a value of the flag bit may be stored and updated in a frame-by-frame sequence by shifting the binary variable. Therefore, a first number may be obtained by determining the number of set flag bits in the binary variable. In the binary variable, a value of a flag bit being 1 indicates that the flag bit is set (may also be referred to as the set flag bit). A utilization rate of a memory on the processor of the network device may be improved by recording the value of the flag bit in a manner of shifting the binary variable. M is an integer greater than 1.

In an exemplary scenario, a 16-bit binary variable 0b 0000 0000 0000 0000 may be preset. When it is determined that the i-th gravitational acceleration vector changes relative to the (i−1)-th gravitational acceleration vector, a value of the lowest bit of the variable is set to 1; otherwise, the value of the lowest bit remains unchanged, that is, remains at 0. At this case, the lowest bit of the variable corresponds the flag bit of the i-th image frame. When the collecting device collects an (i+1)-th image frame, the variable is shifted to the left by one bit, and it is determined whether the (i+1)-th gravitational acceleration vector changes relative to the i-th gravitational acceleration vector. When it is determined that the (i+1)-th gravitational acceleration vector changes relative to the i-th gravitational acceleration vector, the value of the lowest bit of the variable is set to 1; otherwise, the value of the lowest bit remains at 0, and so on.

At step 102, it is determined whether the collecting device tends to be stable after a motion according to the number of the set flag bits in consecutive image frames. If no, step 103 is performed; if yes, step 104 is performed.

In an example, the first number of the set flag bits in M consecutive image frames before the i-th image frame is determined. If the first number is greater than a first number threshold, it is determined that the collecting device is subjected to a motion, and a second number of the set flag bits in N consecutive image frames before the i-th image frame is determined, where N is a positive integer less than M. If the second number is less than a second number threshold, it is determined that the collecting device tends to be stable after the motion; and otherwise, it is determined that the collecting device is unstable.

If the first number is greater than the first number threshold, it indicates that the collecting device is subjected to a motion (such as, a viewing angle change, a pose adjustment or the like) within a time period of M consecutive image frames. In this case, it is further determined that the second number of the set flag bits in the N consecutive image frames before the i-th image frame to further determine whether the collecting device stops moving and tends to be stable. When the second number is less than the second number threshold, it indicates that the collecting device already tends to be stable. Since it is desired to acquire when the device tends to be stable after the motion in time, it is required to monitor whether the second number in a particular number of image frames, such as, in the above N consecutive image frames, is less than the second number threshold in time. If the second number is less than the second number threshold, it indicates that the collecting device gradually tends to be stable at this time. Therefore, the number N of image frames for determining whether the collecting device tends to be stable after the motion is less than the number M of image frames for determining whether the collecting device is subjected to a motion, and the statistics of the N image frames is the latest monitoring data.

Based on the above scenario, if the current binary variable for M consecutive image frames (M=16) before the i-th image frame is 1111 1111 0100 0000, the set flag bits in the 16 consecutive image frames include 9 bits with the value being 1, and thus, the first number is 9. If the first number threshold is 5 which is less than the first number 9, it is determined that the collecting device is subjected to a motion. Then, if it is determined that the set flag bits in the N consecutive image frames (N=8) before the i-th image frame include 1 bit with the value being 1, the second number is 1. If the second number threshold is 2, which is greater than the second number 1, it is determined that the collecting device already tends to be stable.

At step 103, a ground in the i-th image frame is determined with a current ground equation.

If the collecting device is unstable, it indicates that the collecting device still moves, it is not required to re-detect the ground, and the ground in the i-th image frame may be determined by directly using the current ground equation. The current ground equation refers to a ground equation obtained after determining that the ground is to be re-detected last time. In an example, if it is determined that a ground in the 500th image frame is to be re-detected, the ground in the 500th image frame is re-detected, but ground re-detection for the 500th image frame fails and next, a ground in the 501th image frame is re-detected, but ground re-detection for the 501th image frame fails, . . . , and a ground for the 508th image frame is re-detected, and ground re-detection for the 508th image frame succeeds, thereby obtaining a ground equation. In this case, the current ground equation thereafter is the ground equation detected in the 508th image frame until it is determined that the ground is to be re-detected next time and another ground equation is successfully obtained.

At step 104, a similarity between the i-th gravitational acceleration vector and a ground normal vector corresponding to the current ground equation is determined.

The cosine similarity may be taken as the similarity between the i-th gravitational acceleration vector and the ground normal vector corresponding to the current ground equation. A calculation formula (2) is as follows:

$$\text{Cosine } Similarity2 = \left|\frac{\vec{g} \cdot \vec{n}}{|\vec{g}'||\vec{n}'|}\right| = |\vec{g}' \cdot \vec{n}'|. \tag{2}$$

In the above formula (2), the i-th gravitational acceleration vector $\vec{g}$ and the ground normal vector $\vec{n}$ corresponding to the current ground equation are both unit vectors.

At step 105, if the similarity is less than a similarity threshold, it is determined that the ground in the i-th image frame is to be re-detected.

In a practical application, the ground normal vector corresponding to the ground equation should be very approximate to the gravitational acceleration vector collected by the collecting device. In this way, the ground determined by using the ground equation is an accurate ground. Therefore, if the similarity is less than the similarity threshold, for example, 0.996, it indicates that the i-th gravitational acceleration vector greatly differs from the ground normal vector corresponding to the current ground equation, and the ground equation of the i-th image frame is to be re-determined.

In an example, when the similarity between the i-th gravitational acceleration vector and the ground normal vector corresponding to the current ground equation is less than the similarity threshold, it is determined that the ground in the i-th image frame is to be re-detected. After it is determined that the ground is to be re-detected each time, a number of times of re-detection may be increased by 1. The number of times of re-detection refers to a number of times of determining that a ground is re-detected within a time period from a timing of detecting that the collecting device tends to be stable after pose change or a motion to a timing of detecting that the collecting device is subjected to pose change or a motion next time. The number of times of re-detection may be understood as the number of times of determining that a ground is to be re-detected during a stable period of the collecting device. When the next pose change or motion of the collecting device is detected, the number of times of re-detection is cleared to zero.

After the second number of the set flag bits in N consecutive image frames before the i-th image frame is determined as described above, a multiple of the second number relative to the second number threshold is determined. If the multiple is greater than a first preset multiple threshold, the number of times of re-detection is cleared to zero; otherwise, it is determined whether the number of times of re-detection is greater than the second number. If the number of times of re-detection is greater than the second number, the similarity threshold is replaced with a loose threshold and the number of times of re-detection is cleared to zero, thereby avoiding unnecessary re-detection. The loose threshold refers to a value less than the similarity threshold. For example, the similarity threshold 0.996 is replaced with 0.992.

The first preset multiple threshold may be set according to an actual requirement, for example, may be set to 2. When the multiple of the second number relative to the second number threshold is greater than the first preset multiple threshold, it indicates that the stable period of the collecting device is ended (that is, the depth camera is in an unstable state), and the number of times of re-detection is cleared to zero. When the multiple of the second number relative to the second number threshold is less than or equal to the first preset multiple threshold, it is determined whether the number of times of re-detection is greater than the second number. If the recorded number of times of re-detection is greater than the second number, it indicates that the number of times of re-detection is excessive. At this time, the scenario detection is difficult, and it is desired to replace the similarity threshold with the loose threshold and clear the number of times of re-detection to zero, thereby avoiding unnecessary re-detection. The difficult scenario detection may include two cases: case 1, the gravitational acceleration vector output by the collecting device has a relatively large error; and case 2, the depth camera has a relatively large elevation angle, which results in a relatively large depth of the ground from the depth camera, and the ground exposed in the collected depth image is little and far, thereby causing a relatively large error of the determined ground equation.

Based on the above implementation, it is determined whether the collecting device tends to be stable after a motion according to the number of the set flag bits in the consecutive image frames. When it is determined that the collecting device tends to be stable after the motion, it is determined whether the ground in the i-th image frame is to be re-detected by using the similarity between the i-th gravitational acceleration vector and the ground normal vector corresponding to the current ground equation, thereby filtering out vibration interference. When the collecting device is subjected to viewing angle change, pose adjustment, and/or vibration interference, whether to re-detect the ground may be accurately determined by using the above method, so as to ensure that the output ground is accurate. Further, in the method of determining that a ground is to be re-detected, calculation complexity is low, determination accuracy is high, and no manual intervention is required.

Figure 2A:
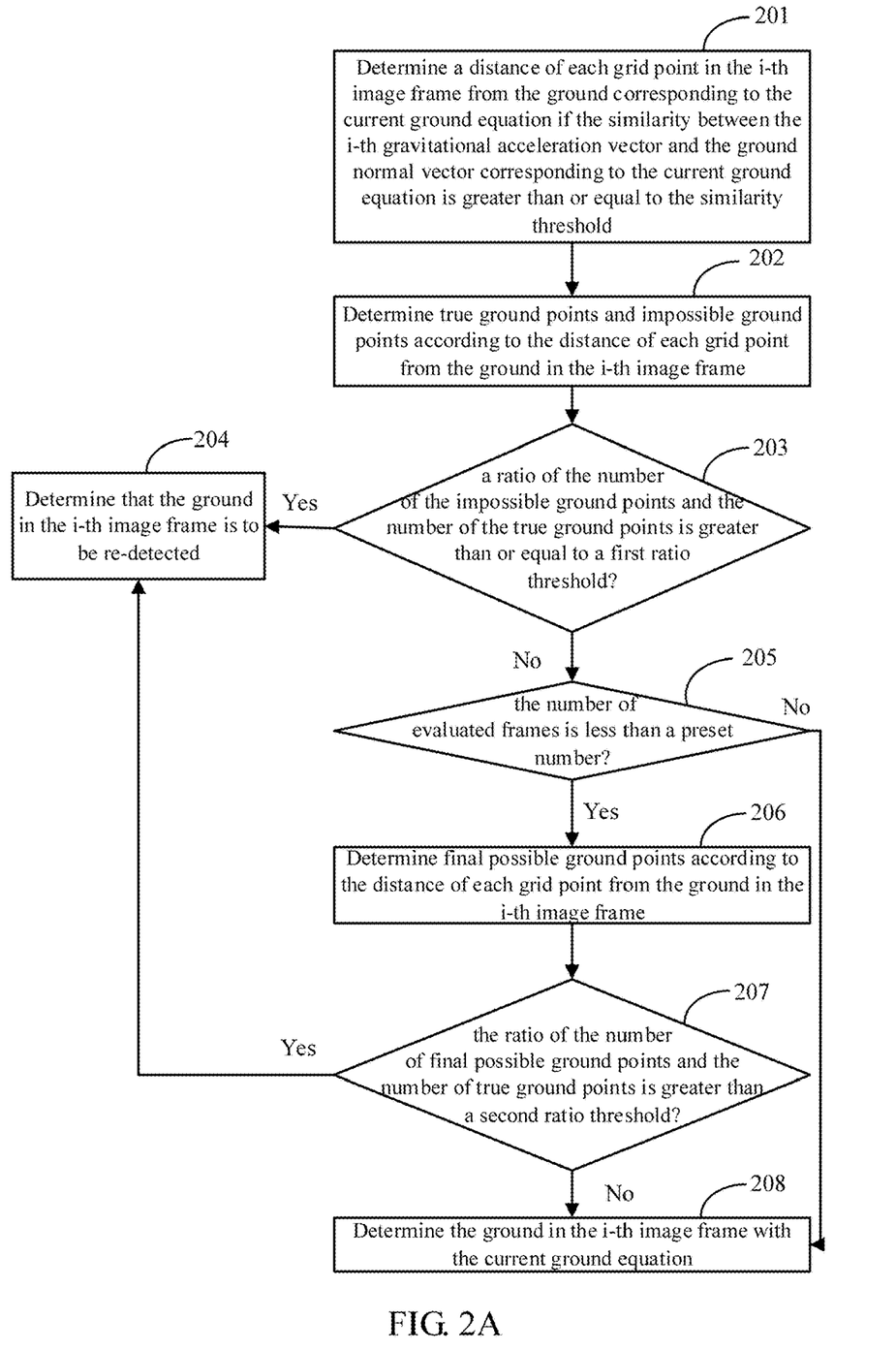
FIG. 2A is a flowchart illustrating a method of determining whether a ground is to be re-detected according to another example of the present disclosure.

FIG. 2A is a flowchart illustrating a method of determining whether a ground is re-detected according to another example of the present disclosure. FIG. 2A is based on FIG. 1A. As shown in FIG. 2A, in a case that the similarity between the i-th gravitational acceleration vector and the ground normal vector corresponding to the current ground equation is greater than the similarity threshold, illustrative descriptions are made with how to further evaluate an actual detection effect of the ground equation as an example. In an example of the present disclosure, when the i-th gravitational acceleration vector is acquired from the gravitational accelerometer, a number of evaluated frames is increased by 1, where the number of the evaluated frames is used to determine the number of image frames acquired after it is determined that the ground is to be re-detected each time. The number of evaluated frames is cleared to zero after it is determined that the ground is to be re-detected each time. In this way, the number of evaluated frames is re-determined after it is determined that the ground is to be re-detected.

As shown in FIG. 2A, the method of determining whether a ground is re-detected includes the following steps.

At step 201, if the similarity between the i-th gravitational acceleration vector and the ground normal vector corresponding to the current ground equation is greater than or equal to the similarity threshold, a distance of each grid point in the i-th image frame from the ground corresponding to the current ground equation is determined.

In an example, when the similarity between the i-th gravitational acceleration vector and the ground normal vector corresponding to the current ground equation is greater than or equal to the similarity threshold, it indicates that the current collecting device is still in the stable period, the current ground equation (a previously determined ground equation) satisfies the requirement of the i-th image frame, and whether to re-detect the ground may be further determined by using the current ground equation.

In an example, the processor in the network device firstly establishes grids formed by horizontal lines and vertical lines based on a preset step length in the i-th image frame, where each grid point is an intersection point of the horizontal line and the vertical line.

The preset step length refers to a difference between pixel index values of two grid points in a horizontal or vertical direction, and may be set according to actual experiences. Since a difference between depth values of adjacent points in a depth image is relatively small, by establishing grids, the depth value of the intersection point between the horizontal line and the vertical line may be used to indicate the depth value of some points close to the intersection point. The depth value refers to a gray value.

Figure 2B:
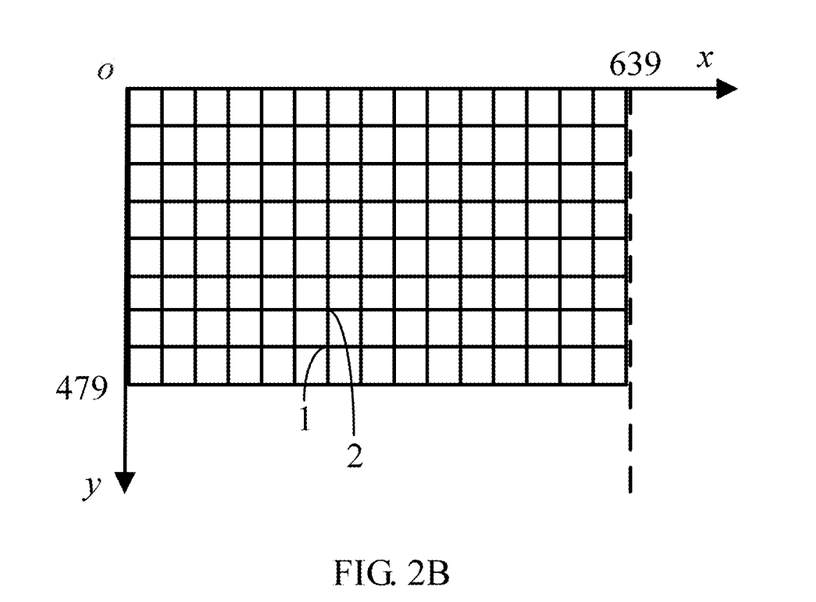
FIG. 2B is a schematic diagram illustrating grids establishment according to the example shown n FIG. 2A.

In an exemplary scenario, as shown in FIG. 2B, a resolution of a depth image collected by the depth camera is 640×480. A pixel coordinate system is established by taking a vertex at an upper left corner of the depth image as a coordinate origin o, the horizontal direction as x-axis, the vertical direction as y-axis, and grids are established based on the preset step length in the depth image. Therefore, pixel coordinates of four vertexes of the grids are (0, 0), (639, 0), (0, 479) and (639, 479) respectively.

In an example, for each grid point in the depth image, the spatial coordinates of the grid point in the camera coordinate system may be determined according to the pixel coordinates of the grid point in the i-th image frame, and the distance of the grid point from the ground corresponding to the current ground equation may be calculated by using the spatial coordinates based on the following formula (3):

$$d = \frac{AX' + BY' + CZ' + D}{\sqrt{A^2 + B^2 + C^2}}. \quad (3)$$

In the above formula (3), the current ground equation may be indicated by a formula Ax+By+Cz+D=0, where A, B, C and D are respectively constant coefficients of the current ground equation. In the camera coordinate system, B<0, that is, the direction of the normal vector of the current ground equation is upward, and (X', Y', Z') is the spatial coordinates of the grid point.

At step 202, true ground points and impossible ground points are determined according to the distance of each grid point from the ground in the i-th image frame.

In an example, a grid point with an absolute value of the distance less than a particular distance threshold, such as, 40 mm, is determined as a true ground point. The impossible ground points are located under the ground corresponding to the current ground equation. Since a distance of the point under the ground from the ground corresponding to the current ground equation is a negative number, the point of which the distance is a negative number and the absolute value of the distance is greater than the distance threshold is determined as the impossible ground point.

At step 203, it is determined whether a ratio of the number of the impossible ground points and the number of the true ground points is greater than or equal to a first ratio threshold. If yes, step 204 is performed; and otherwise, step 205 is performed. The first ratio threshold may be 0.2.

At step 204, it is determined that the ground in the i-th image frame is to be re-detected.

For the above process from step 201 to step 204, when the similarity between the i-th gravitational acceleration vector and the ground normal vector corresponding to the current ground equation is greater than or equal to the similarity threshold, a detection effect of the current ground equation may be further evaluated based on the ratio of the number of impossible ground points and the number of true ground points. In this way, the current ground equation may be evaluated by the actual detection effect, so as to ensure that the output ground is accurate.

At step 205, it is determined whether the number of evaluated frames is less than a preset number. If yes, step 206 is performed; otherwise, step 208 is performed. The preset number may be 100.

At step 206, final possible ground points are determined according to the distance of each grid point from the ground in the i-th image frame.

In an example, if the distance of a grid point in the i-th image frame from the ground is greater than a first positive threshold (greater than the distance threshold, such as 50 mm) and a multiple of the distance relative to the first positive threshold is less than a second preset multiple threshold, such as, 2.0, the grid point may be determined as a first possible ground point, and the following operations may be performed for each first possible ground point $P_{may}$.

The coordinates of the first possible ground point $P_{may}$ in the i-th image frame are $(x_{may}, y_{may})$, and the depth value of the first possible ground point is dep. The coordinates of a point $P_{mayUp}$ above the first possible ground point $P_{may}$ are $(x_{may}, y_{may}$—may step length), and the depth value of the point $P_{mayUp}$ is $dep_{up}$. If $dep_{up}$−dep>threDepMay, the first possible ground point $P_{may}$ may be recorded as the final possible ground point; and otherwise, the first possible ground point $P_{may}$ is discarded, where threDepMay is a second positive threshold. The second positive threshold may be 5 mm.

When a distance of a grid point in the i-th image frame from the ground is greater than the first positive threshold and the multiple of the distance relative to the first positive threshold is less than the second preset multiple threshold, the grid point may be determined as the first possible ground point. To eliminate the interference of objects above the ground to the ground, it is screened based on a change rule of the depth value of the point in the ground in the vertical direction (y-axis) of the depth image. The change rule is as follows: the lower the point in the ground in the depth image is, that is, the larger a y-value is, the smaller the depth value is. In FIG. 2B, the coordinates of the first possible ground point 1 are $(x_1, y_1)$, and the depth value of the first possible ground point 1 is dept; the coordinates of a second possible ground point 2 are $(x_1, y_1$-step length), and the depth value is $dep_2$; the second possible ground point 2 is located above the first possible ground point 1; when $dep_2$−$dep_1$ is greater than the second positive threshold, the first possible ground point 1 may be determined as the final possible ground point.

Figure 2C:
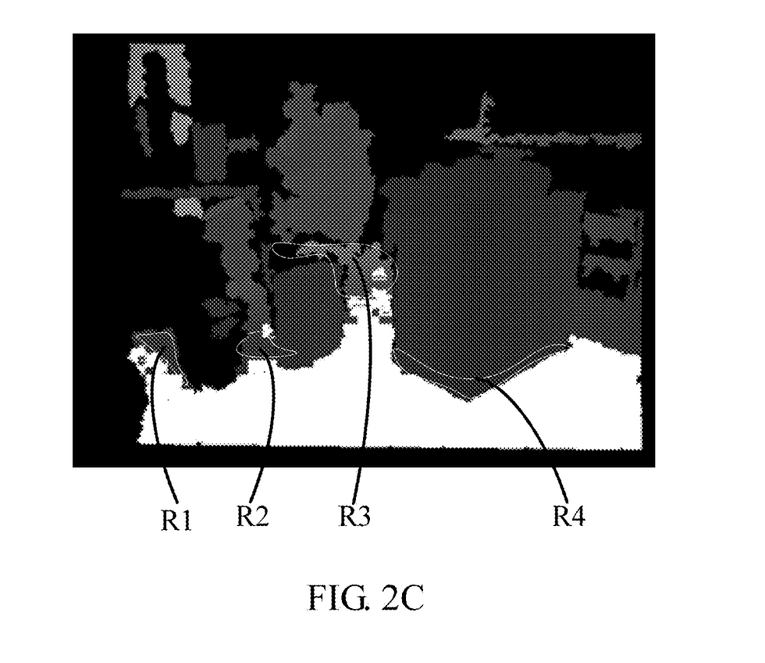
FIG. 2C is a schematic diagram illustrating a ground detection result according to the example shown in FIG. 2A.

In an exemplary scenario, a white and bright region as shown in FIG. 2C is a ground region determined by using the current ground equation, and points in four regions R1, R2, R3 and R4 marked at gaps between objects are first possible ground points. That is, the distance of each grid point in these four regions R1, R2, R3 and R4 from the ground corresponding to the current ground equation is greater than the first positive threshold, and the multiple of the distance relative to the first positive threshold is less than the second preset multiple threshold. Based on the change rule of the point in the ground in the vertical direction of the image, it is found that the points in the region R4 do not satisfy the change rule, but the points in the regions R1, R2 and R3 all satisfy the change rule. In this case, the points in the regions R1, R2 and R3 are determined as final possible ground points, and the points in the region R4 are discarded.

At step 207, it is determined whether the ratio of the number of final possible ground points and the number of true ground points is greater than a second ratio threshold. If yes, return to step 204; and otherwise, step 208 is performed. The second ratio threshold may be 0.2.

In the above process from step 205 to step 207, when the ratio of the number of impossible ground points and the number of true ground points is less than the first ratio threshold and the number of evaluated frames is less than the preset number, the detection effect of the current ground equation may be further evaluated based on the ratio of the number of final possible ground points and the number of true ground points. In this way, the current ground equation is evaluated by the actual detection effect, so as to ensure that the output ground is accurate.

At step 208, the ground in the i-th image frame is determined with the current ground equation.

In an example, when the ratio of the number of impossible ground points and the number of true ground points is less than the first ratio threshold and the number of evaluated frames is greater than the preset number, or the ratio of the number of final possible ground points and the number of true ground points is less than the second ratio threshold, it indicates that the current ground equation satisfies the requirement of the i-th image frame, and the ground in the i-th image frame may be indicated by the current ground equation.

In the examples shown in FIGS. 2A-2C, when the similarity between the i-th gravitational acceleration vector and the ground normal vector corresponding to the current ground equation is greater than the similarity threshold, the detection effect of the current ground equation may be firstly evaluated based on the ratio of the number of impossible ground points and the number of true ground points. If the ratio of the number of impossible ground points and the number of true ground points is less than the first ratio threshold and the number of evaluated frames (for counting the number of image frames obtained after determining that the ground is to be re-detected each time) is less than the preset number, the detection effect of the current ground equation may be further evaluated based on the ratio of the number of final possible ground points and the number of true ground points. In this way, based on a case that the detection effect of the current ground equation is evaluated by the final possible ground points and the impossible ground points, it is ensured that the output ground is accurate.

Corresponding to the foregoing examples of the method of determining whether the ground is to be re-detected, the present disclosure further provides examples of an apparatus for determining whether a ground is to be detected.

Figure 3:
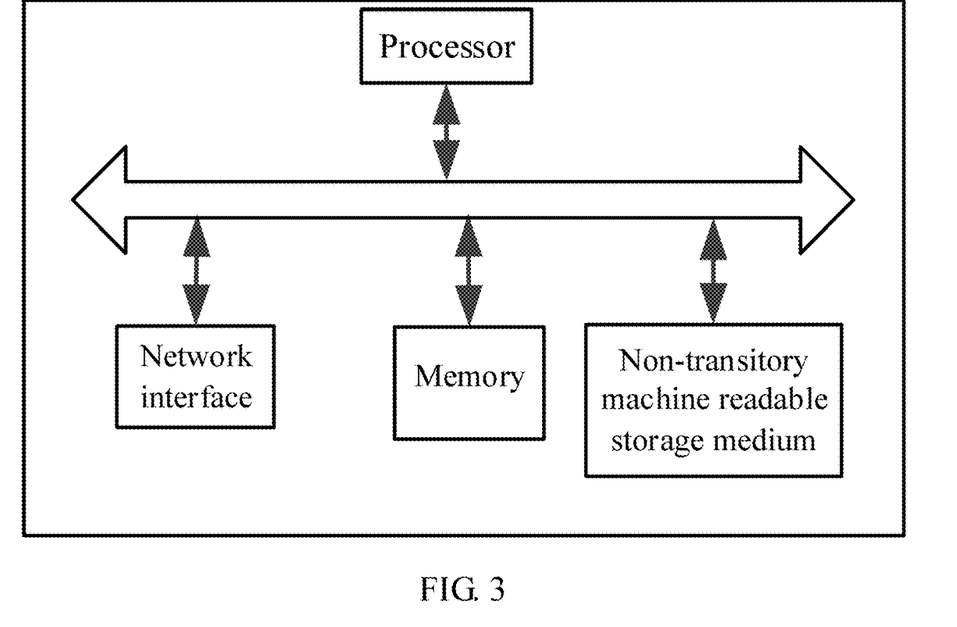
FIG. 3 is a hardware structure diagram of a network device according to an example of the present disclosure.

Examples of the apparatus for determining whether a ground is to be detected can be applied to a network device. The apparatus examples may be implemented by software, or may be implemented by hardware or a combination of hardware and software. Taking the software implementation as an example, as a logical apparatus, it is formed in a way that the processor of the network device reads the corresponding machine executable instructions stored in the non-transitory machine readable storage medium into the memory. From a hardware level, as shown in FIG. 3, it is a hardware structure diagram of a network device according to an example of the present disclosure, in addition to the processor, the memory, a network interface, and the non-transitory machine readable storage medium shown in FIG. 3, the network device generally includes other hardware according to the actual function of the network device, and further details are omitted for brevity. The collecting device may be coupled to the network device through the network interface.

Figure 4:
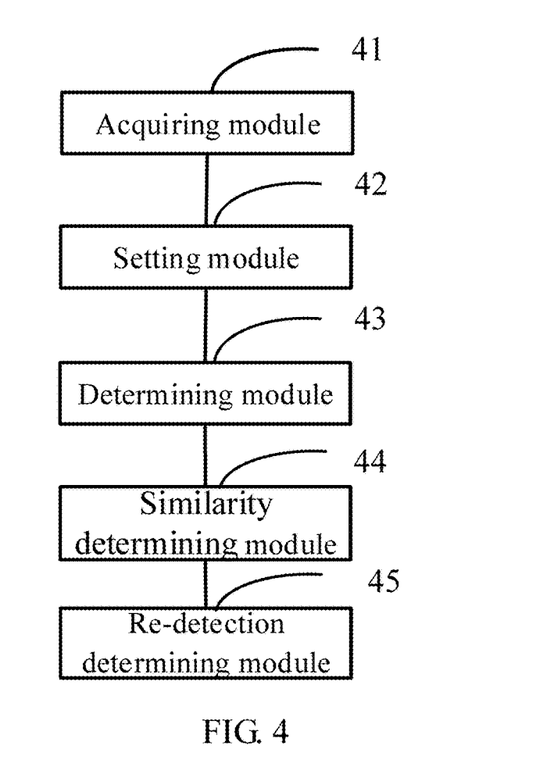
FIG. 4 is a block diagram of an apparatus for determining whether a ground is to be re-detected according to an example of the present disclosure.

FIG. 4 is a block diagram of an apparatus for determining whether a ground is to be re-detected according to an example of the present disclosure. As shown in FIG. 4, the apparatus includes an acquiring module 41, a setting module 42, a determining module 43, a similarity determining module 44 and a re-detection determining module 45.

The acquiring module 41 is configured to acquire an i-th gravitational acceleration vector corresponding to an i-th image frame.

The setting module 42 is configured to set a value to a flag bit of the i-th image frame in response to determining that the i-th gravitational acceleration vector changes relative to an (i−1)-th gravitational acceleration vector corresponding to an (i−1)-th image frame.

The determining module 43 is configured to determine whether the collecting device tends to be stable after a motion according to a number of set flag bits in consecutive image frames.

The similarity determining module 44 is configured to determine a similarity between the i-th gravitational acceleration vector and a ground normal vector corresponding to a current ground equation in response to determining that the collecting device tends to be stable after the motion.

The re-detection determining module 45 is configured to determine that the ground in the i-th image frame is to be re-detected in response to determining that the similarity is less than a similarity threshold.

In some cases, the determining module 43 is configured to determine a first number of set flag bits in M consecutive frames before the i-th image frame, wherein M is an integer greater than 1; in response to determining that the first number is greater than a first number threshold, determine that the collecting device has the motion, and determine a second number of set flag bits in N consecutive frames before the i-th image frame, wherein N is a positive integer less than M; in response to determining that the second number is less than a second number threshold, determine that the collecting device tends to be stable after the motion; and in response to determining that the second number is greater than or equal to the second number threshold, determine that the collecting device is unstable.

In an example, the apparatus further includes a first counting module and a threshold replacing module, which are not shown in FIG. 4.

The first counting module is configured to increase a number of times of re-detection by 1 after determining that the ground is to be re-detected each time.

The threshold replacing module is configured to after determining the second number of the set flag bits in the N consecutive frames before the i-th image frame, determine a multiple of the second number relative to the second number threshold; in response to determining that the multiple is greater than a first preset multiple threshold, clear the number of times of re-detection to zero; in response to determining that the multiple is less than or equal to the first preset multiple threshold, determine whether the number of times of re-detection is greater than the second number; and in response to determining that the number of times of re-detection is greater than the second number, replace the similarity threshold with a value less than the similarity threshold, and clear the number of times of re-detection to zero.

Figure 5:
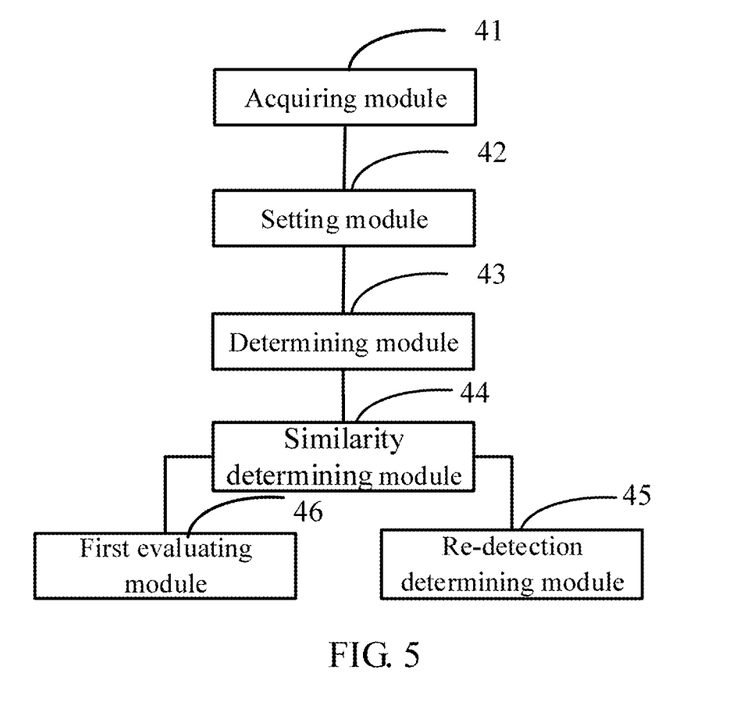
FIG. 5 is a block diagram of an apparatus for determining whether a ground is to be re-detected according to another example of the present disclosure.

FIG. 5 is a block diagram of an apparatus for determining whether a ground is to be re-detected according to another example of the present disclosure. On the basis of the example of FIG. 4, as shown in FIG. 5, the apparatus further includes a first evaluating module 46.

The first evaluating module 46 is configured to after determining the similarity between the i-th gravitational acceleration vector and a ground normal vector corresponding to a current ground equation, if the similarity is greater than or equal to the similarity threshold, determine a distance of each of grid points in the i-th image frame from the ground corresponding to the current ground equation, wherein grids formed by horizontal lines and vertical lines are established based on a preset step length in the i-th image frame, and each of the grid points is an intersection point of the horizontal line and the vertical line; determine true ground points and impossible ground points according to the distance of each of the grid points from the ground corresponding to the current ground equation, wherein the impossible ground points are located under the ground corresponding to the current ground equation, an absolute value of a distance between each of the impossible ground points and the ground corresponding to the current ground equation is greater than a distance threshold, and an absolute value of a distance between each of the true ground points and the ground corresponding to the current ground equation is less than or equal to the distance threshold; and if a ratio of a number of the impossible ground points and a number of the true ground points is greater than or equal to a first ratio threshold, determine that the ground in the i-th image frame is to be re-detected.

In an example, the apparatus further includes a second counting module, which is not shown in the FIG. 5.

The second counting module is configured to when the i-th gravitational acceleration vector is acquired from the collecting device, increase a number of evaluated frames by 1.

The apparatus further includes a second evaluating module, which is not shown in FIG. 5. The second evaluating module is configured to in response to determining that the ratio of the number of the impossible ground points and the number of the true ground points is less than the first ratio threshold and the number of the evaluated frames is less than a preset number, determine final possible ground points according to the distance of each of the grid points from the ground corresponding to the current ground equation; and in response to determining that a ratio of the number of the final possible ground points and the number of the true ground points is greater than a second ratio threshold, determine that the ground in the i-th image frame is to be re-detected.

In an example, determining the final possible ground points according to the distance of each of the grid points from the ground corresponding to the current ground equation includes: for each of the grid points, in response to determining that the distance of the grid point from the ground corresponding to the current ground equation is greater than a first positive threshold, and a multiple of the distance relative to the first positive threshold is less than a second preset multiple threshold, determining the grid point as a first possible ground point; determining a first ground point set based on each of the first possible ground points; for each of the first possible ground points in the first ground point set, acquiring a first depth value of the first possible ground point; determining a second possible ground point with a distance from the first possible ground point being the preset step length in the first ground point set, wherein the second possible ground point is located at a same vertical line as the first possible ground point, and an ordinate of the second possible ground point is less than an ordinate of the first possible ground point; acquiring a second depth value of the second possible ground point; obtaining a depth difference by subtracting the first depth value from the second depth value; and when the depth difference is greater than or equal to a second positive threshold, recording the first possible ground point as the final possible ground point.

The specific details of the implementation process of the functions and roles of the respective modules in the above apparatus are set forth in the implementation process of the corresponding steps in the above method, which are not redundantly described herein.

For the device embodiments that substantially correspond to the method embodiments, the correlations therebetween just refer to part of the descriptions of the method embodiments. The device embodiments described above are merely schematic, wherein the units explained as separate components may be physically separated or not, and components displayed as units may be physical units or not, which can be located in the same place or distributed to a plurality of network units. Part or all of the modules may be selected according to actual requirements to achieve the purposes of the schemes of the present disclosure. A person skilled in the art can understand and implement these schemes without creative efforts.

Figure 6:
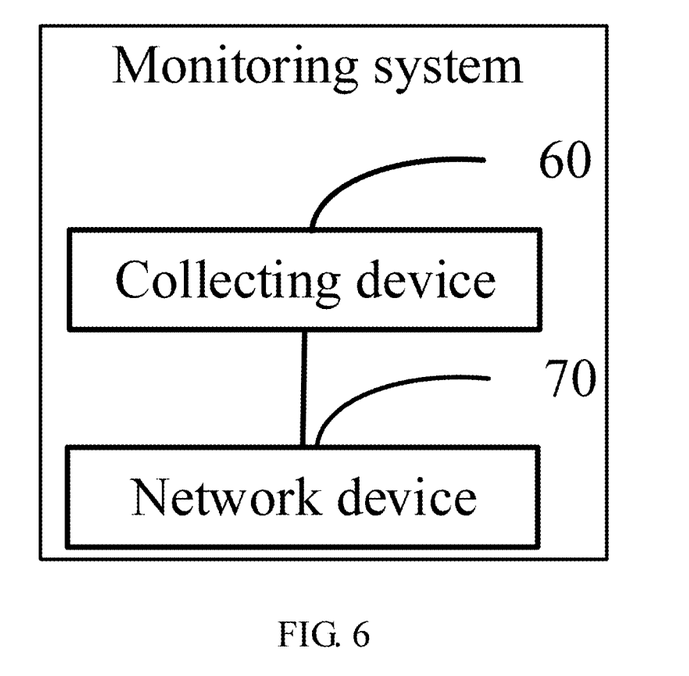
FIG. 6 is a hardware structure diagram of a monitoring system according to an example of the present disclosure.

FIG. 6 is a hardware structure diagram of a monitoring system according to an example of the present disclosure. As shown in FIG. 6, the monitoring system includes a collecting device 60 and a network device 70.

The collecting device 60 is configured to collect an i-th gravitational acceleration vector corresponding to an i-th image frame.

The network device 70 include but not limited to the processor, the memory, the network interface, and the non-transitory machine readable storage medium shown in FIG. 3. When invoking the machine executable instructions, the processor is caused to perform operations of the methods in the above examples.

In an example, a non-transitory machine readable storage medium storing machine executable instructions is provided. When invoking the machine executable instructions, the processor is caused to perform operations of the methods in the above examples.

The above are merely preferred embodiments of the present disclosure rather than limiting the present disclosure. Any modification, equivalent replacement, improvement and the like made within the spirit and principles of the present disclosure should fall into the scope of protection of the present disclosure.

What is claimed is:

1. A method of determining whether a ground is to be re-detected, comprising:
    acquiring an i-th gravitational acceleration vector corresponding to an i-th image frame from a collecting device, wherein i is an integer greater than 1, and the collecting device comprises a gravitational accelerometer and a depth camera;
    in response to determining that the i-th gravitational acceleration vector changes relative to an (i−1)-th gravitational acceleration vector corresponding to an (i−1)-th image frame, setting a value to a flag bit of the i-th image frame;
    determining whether the collecting device tends to be stable after a motion according to a number of set flag bits in consecutive image frames;
    in response to determining that the collecting device tends to be stable after the motion, determining a similarity between the i-th gravitational acceleration vector and a ground normal vector corresponding to a current ground equation; and
    in response to determining that the similarity is less than a similarity threshold, determining that the ground in the i-th image frame is to be re-detected.

2. The method of claim 1, wherein determining whether the collecting device tends to be stable after the motion according to the number of the set flag bits in the consecutive image frames comprises:
    determining a first number of set flag bits in M consecutive frames before the i-th image frame, wherein M is an integer greater than 1;
    in response to determining that the first number is greater than a first number threshold,
        determining that the collecting device has the motion, and
        determining a second number of set flag bits in N consecutive frames before the i-th image frame, wherein N is a positive integer less than M;
    in response to determining that the second number is less than a second number threshold, determining that the collecting device tends to be stable after the motion; and
    in response to determining that the second number is greater than or equal to the second number threshold, determining that the collecting device is unstable.

3. The method of claim 2, wherein after determining that the ground is to be re-detected, the method further comprises:
    increasing a number of times of re-detection by 1;
    after determining the second number of the set flag bits in the N consecutive frames before the i-th image frame, the method further comprises:
    determining a multiple of the second number relative to the second number threshold;
    in response to determining that the multiple is greater than a first preset multiple threshold, clearing the number of times of re-detection to zero;
    in response to determining that the multiple is less than or equal to the first preset multiple threshold, determining whether the number of times of re-detection is greater than the second number;
    in response to determining that the number of times of re-detection is greater than the second number,
        replacing the similarity threshold with a value less than the similarity threshold, and
        clearing the number of times of re-detection to zero.

4. The method of claim 1, further comprising:
    in response to determining that the similarity is greater than or equal to the similarity threshold, determining a distance of each of grid points in the i-th image frame from the ground corresponding to the current ground equation, wherein grids formed by horizontal lines and vertical lines are established based on a preset step length in the i-th image frame, and each of the grid points is an intersection point of the horizontal line and the vertical line;
    determining true ground points and impossible ground points according to the distance of each of the grid points from the ground corresponding to the current ground equation, wherein the impossible ground points are located under the ground corresponding to the current ground equation, an absolute value of a distance between each of the impossible ground points and the ground corresponding to the current ground equation is greater than a distance threshold, and an absolute value of a distance between each of the true ground points and the ground corresponding to the current ground equation is less than or equal to the distance threshold; and
    in response to determining that a ratio of a number of the impossible ground points and a number of the true ground points is greater than or equal to a first ratio threshold, determining that the ground in the i-th image frame is to be re-detected.

5. The method of claim 4, further comprising:
    when the i-th gravitational acceleration vector is acquired from the collecting device, increasing a number of evaluated frames by 1;
    wherein the method further comprises:
    in response to determining that the ratio of the number of the impossible ground points and the number of the true ground points is less than the first ratio threshold and the number of the evaluated frames is less than a preset number, determining final possible ground points according to the distance of each of the grid points from the ground corresponding to the current ground equation; and in response to determining that a ratio of the number of the final possible ground points and the number of the true ground points is greater than a second ratio threshold, determining that the ground in the i-th image frame is to be re-detected.

6. The method of claim 5, wherein determining the final possible ground points according to the distance of each of the grid points from the ground corresponding to the current ground equation comprises:

for each of the grid points,
in response to determining that the distance of the grid point from the ground corresponding to the current ground equation is greater than a first positive threshold, and a multiple of the distance relative to the first positive threshold is less than a second preset multiple threshold, determining the grid point as a first possible ground point;
determining a first ground point set based on each of the first possible ground points;
for each of the first possible ground points in the first ground point set,
acquiring a first depth value of the first possible ground point;
determining a second possible ground point with a distance from the first possible ground point being the preset step length in the first ground point set, wherein the second possible ground point is located at a same vertical line as the first possible ground point, and an ordinate of the second possible ground point is less than an ordinate of the first possible ground point;
acquiring a second depth value of the second possible ground point;
obtaining a depth difference by subtracting the first depth value from the second depth value; and
when the depth difference is greater than or equal to a second positive threshold, recording the first possible ground point as the final possible ground point.

7. The method of claim 1, further comprising:
determining a second similarity between the i-th gravitational acceleration vector and the (i−1)-th gravitational acceleration vector; and
when the second similarity is greater than a second similarity threshold, determining that the i-th gravitational acceleration vector changes relative to the (i−1)-th gravitational acceleration vector.

8. The method of claim 7, wherein the second similarity comprises a cosine similarity.

9. A monitoring system, comprising:
a collecting device including a gravitational accelerometer and a depth camera, configured to collect an i-th gravitational acceleration vector corresponding to an i-th image frame;
a machine readable storage medium storing machine executable instructions; and
a processor, when invoking the machine executable instructions, the processor is caused to perform operations comprising:
acquiring the i-th gravitational acceleration vector from the collecting device, wherein i is an integer greater than 1;
in response to determining that the i-th gravitational acceleration vector changes relative to an (i−1)-th gravitational acceleration vector corresponding to an (i−1)-th image frame, setting a value to a flag bit of the i-th image frame;
determining whether the collecting device tends to be stable after a motion according to a number of set flag bits in consecutive image frames;
in response to determining that the collecting device tends to be stable after the motion, determining a similarity between the i-th gravitational acceleration vector and a ground normal vector corresponding to a current ground equation; and
in response to determining that the similarity is less than a similarity threshold, determining that the ground in the i-th image frame is to be re-detected.

10. The system of claim 9, wherein determining whether the collecting device tends to be stable after the motion according to the number of the set flag bits in the consecutive image frames comprises:
determining a first number of set flag bits in M consecutive frames before the i-th image frame, wherein M is an integer greater than 1;
in response to determining that the first number is greater than a first number threshold,
determining that the collecting device has the motion, and
determining a second number of set flag bits in N consecutive frames before the i-th image frame, wherein N is a positive integer less than M;
in response to determining that the second number is less than a second number threshold, determining that the collecting device tends to be stable after the motion; and
in response to determining that the second number is greater than or equal to the second number threshold, determining that the collecting device is unstable.

11. The system of claim 10, wherein after determining that the ground is to be re-detected, the processor is further caused to perform operations comprising:
increasing a number of times of re-detection by 1;
after determining the second number of the set flag bits in the N consecutive frames before the i-th image frame, the processor is further caused to perform operations comprising:
determining a multiple of the second number relative to the second number threshold;
in response to determining that the multiple is greater than a first preset multiple threshold, clearing the number of times of re-detection to zero;
in response to determining that the multiple is less than or equal to the first preset multiple threshold, determining whether the number of times of re-detection is greater than the second number;
in response to determining that the number of times of re-detection is greater than the second number, replacing the similarity threshold with a value less than the similarity threshold, and
clearing the number of times of re-detection to zero.

12. The system of claim 9, wherein the processor is further caused to perform operations comprising:
in response to determining that the similarity is greater than or equal to the similarity threshold, determining a distance of each of grid points in the i-th image frame from the ground corresponding to the current ground equation, wherein grids formed by horizontal lines and vertical lines are established based on a preset step length in the i-th image frame, and each of the grid points is an intersection point of the horizontal line and the vertical line;

determining true ground points and impossible ground points according to the distance of each of the grid points from the ground corresponding to the current ground equation, wherein the impossible ground points are located under the ground corresponding to the current ground equation, an absolute value of a distance between each of the impossible ground points and the ground corresponding to the current ground equation is greater than a distance threshold, and an absolute value of a distance between each of the true ground points and the ground corresponding to the current ground equation is less than or equal to the distance threshold; and in response to determining that a ratio of a number of the impossible ground points and a number of the true ground points is greater than or equal to a first ratio threshold, determining that the ground in the i-th image frame is to be re-detected.

13. The system of claim 12, wherein the processor is further caused to perform operations comprising:

when the i-th gravitational acceleration vector is acquired from the collecting device, increasing a number of evaluated frames by 1;

wherein the processor is further caused to perform operations comprising:

in response to determining that the ratio of the number of the impossible ground points and the number of the true ground points is less than the first ratio threshold and the number of the evaluated frames is less than a preset number, determining final possible ground points according to the distance of each of the grid points from the ground corresponding to the current ground equation; and in response to determining that a ratio of the number of the final possible ground points and the number of the true ground points is greater than a second ratio threshold, determining that the ground in the i-th image frame is to be re-detected.

14. The system of claim 13, wherein determining the final possible ground points according to the distance of each of the grid points from the ground corresponding to the current ground equation comprises:

for each of the grid points,
in response to determining that the distance of the grid point from the ground corresponding to the current ground equation is greater than a first positive threshold, and a multiple of the distance relative to the first positive threshold is less than a second preset multiple threshold, determining the grid point as a first possible ground point;

determining a first ground point set based on each of the first possible ground points;

for each of the first possible ground points in the first ground point set,
acquiring a first depth value of the first possible ground point;

determining a second possible ground point with a distance from the first possible ground point being the preset step length in the first ground point set, wherein the second possible ground point is located at a same vertical line as the first possible ground point, and an ordinate of the second possible ground point is less than an ordinate of the first possible ground point;

acquiring a second depth value of the second possible ground point;

obtaining a depth difference by subtracting the first depth value from the second depth value; and when the depth difference is greater than or equal to a second positive threshold, recording the first possible ground point as the final possible ground point.

15. The system of claim 9, the processor is further caused to perform operations comprising:

determining a second similarity between the i-th gravitational acceleration vector and the (i−1)-th gravitational acceleration vector; and when the second similarity is greater than a second similarity threshold, determining that the i-th gravitational acceleration vector changes relative to the (i−1)-th gravitational acceleration vector.

16. The system of claim 15, wherein the second similarity comprises a cosine similarity.

17. A non-transitory machine readable storage medium storing machine executable instructions, when invoking the machine executable instructions, the processor is caused to perform operations comprising:

acquiring an i-th gravitational acceleration vector corresponding to an i-th image frame from a collecting device, wherein i is an integer greater than 1, and the collecting device comprises a gravitational accelerometer and a depth camera;

in response to determining that the i-th gravitational acceleration vector changes relative to an (i−1)-th gravitational acceleration vector corresponding to an (i−1)-th image frame, setting a value to a flag bit of the i-th image frame;

determining whether the collecting device tends to be stable after a motion according to a number of set flag bits in consecutive image frames;

in response to determining that the collecting device tends to be stable after the motion, determining a similarity between the i-th gravitational acceleration vector and a ground normal vector corresponding to a current ground equation; and in response to determining that the similarity is less than a similarity threshold, determining that the ground in the i-th image frame is to be re-detected.

* * * * *